May 6, 1924.
W. E. SIMPSON
HOIST
Filed Dec. 19, 1919
1,492,581
2 Sheets-Sheet 2
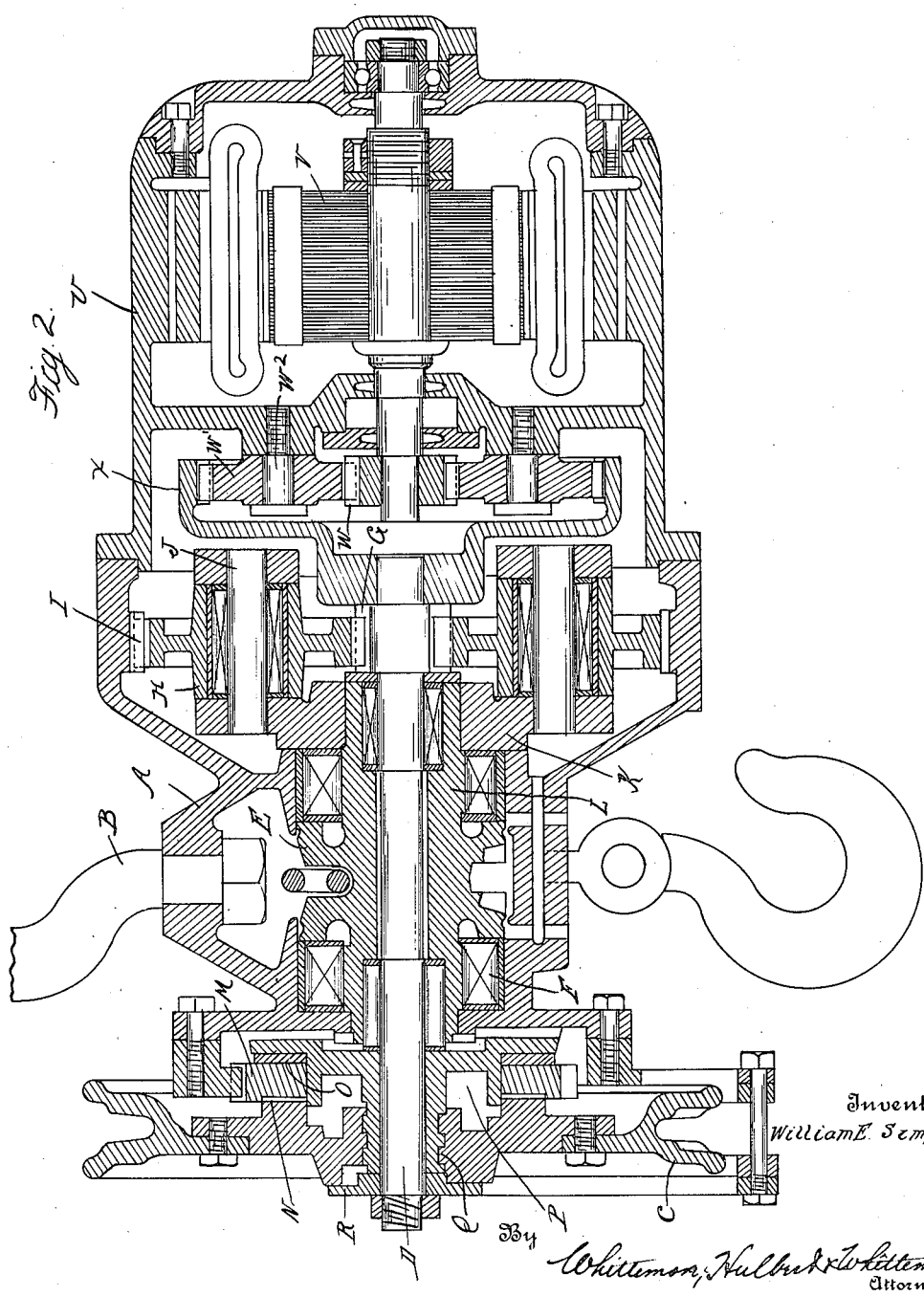

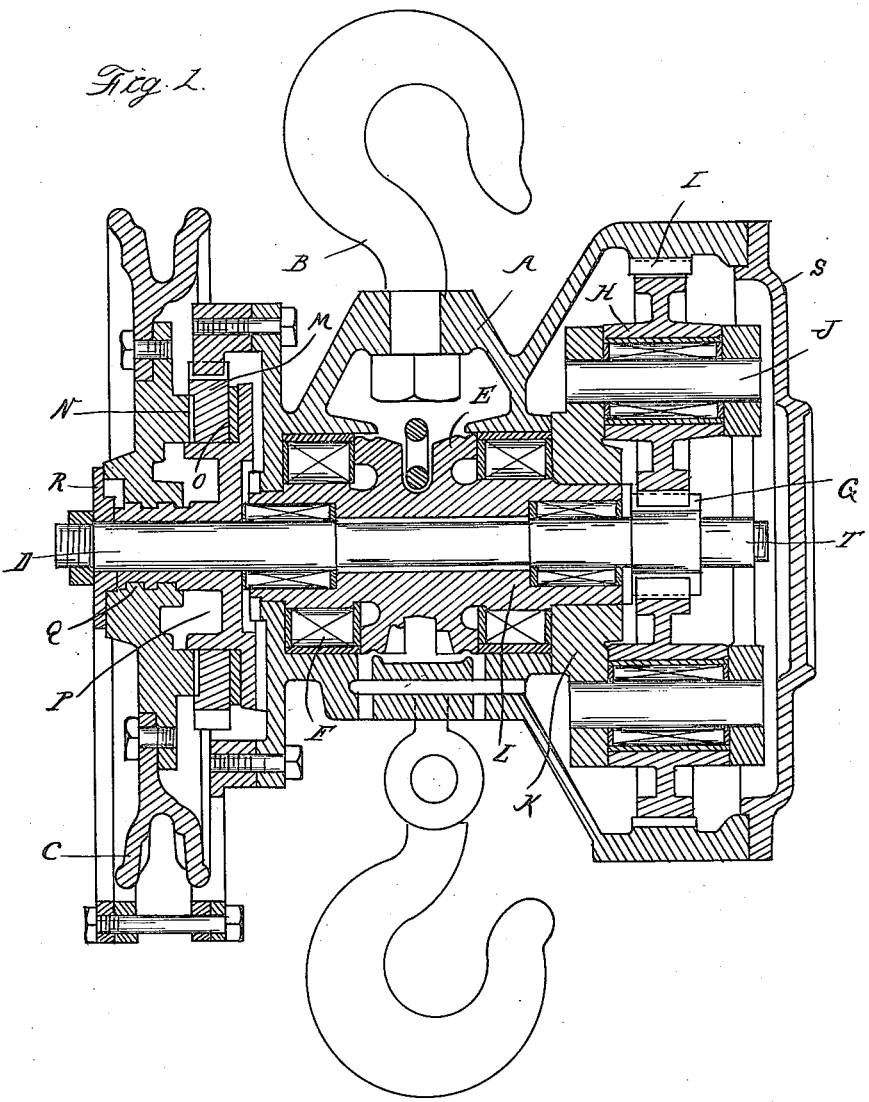

Patented May 6, 1924.

1,492,581

UNITED STATES PATENT OFFICE.

WILLIAM E. SIMPSON, OF DETROIT, MICHIGAN, ASSIGNOR TO PALMER-BEE COMPANY, OF DETROIT, MICHIGAN, A CORPORATION OF MICHIGAN.

HOIST.

Application filed December 19, 1919. Serial No. 345,975.

*To all whom it may concern:*

Be it known that I, WILLIAM E. SIMPSON, a subject of the King of Great Britain and Ireland, residing at Detroit, in the county of Wayne and State of Michigan, have invented certain new and useful Improvements in Hoists, of which the following is a specification, reference being had therein to the accompanying drawings.

The invention relates to hoists of the type designed for manual operation and comprising actuating and actuated chain wheels, a reduction transmission gearing therebetween and a casting for housing the same. Such units are usually of relatively small power and are thus adapted for manual operation, but in certain installations it is advantageous to provide a power drive. It is, therefore, the primary object of the present invention to obtain a construction of hoist adapted for manual operation, but which may be easily converted into a power-actuated device as hereinafter set forth.

In the drawings:

Figure 1 is a central longitudinal section through a hoist of my improved construction showing the same as arranged for manual operation;

Figure 2 is a similar view with the power unit engaged therewith.

In detail, A is a suitable housing provided with means for attachment to a point of support, such as the swiveled hook B arranged centrally thereof. C is the manually operable chain wheel which is mounted upon a shaft D extending axially of the housing. E is the driven or actuated chain wheel, which is sleeved upon the shaft D and is provided with the roller bearings F for carrying the load into the housing A. Between the shaft D and the chain wheel E is a reduction gearing, which as shown comprises a pinion G on the shaft engaging planetary gears H which are in mesh with a surrounding internal gear rack I and which are journaled on pins J carried by a head K mounted on a sleeve extension L of the wheel E. Thus the rotation of the shaft D will be transmitted at greatly reduced angular speed and proportionately greater power to the chain wheel E. The actuating chain wheel C is arranged outside of the housing A at one end of the shaft D, while the reduction gearing is within the housing and at the opposite end of the shaft.

There may be also provided an automatic brake, such as shown, comprising an annular member M anchored to the housing and arranged between an annular breaking face N on the wheel C and an opposite annular breaking face O on a member P, which latter is mounted on the shaft D and has a screw-threaded engagement Q with the wheel C. A collar R is fixed to the shaft D adjacent to the screw-threaded member Q and the arrangement is such that the rotation of the shaft D under actuation of the load will cause a clamping engagement of the surfaces N and O with the member M, thereby holding the wheel C from rotation. If, however, the wheel C is itself actuated, this will release the clamp so as to permit the lowering of the load.

The construction as thus far described is one of the well known type designed for manual operation and to adapt the same for power actuation I have devised the following construction: The end of the housing which encloses the reduction gearing is provided with a detachable cover plate S and the end of the shaft D is extended beyond the pinion G but within the housing, as indicated at T, to form a mounting for a coupling member. The power unit comprises a housing U which when the cap S is removed will seat against the end of the housing A and form an extension thereof. Within the housing U is an electric motor V of any suitable construction and also within this housing and between the motor and the shaft D is a reduction gearing, through which the power of the motor is transmitted to the shaft D. This reduction gearing as shown comprises a pinion W on the motor shaft engaging planetary pinions W' mounted on pins W² secured to the housing U, and an internal gear wheel in mesh with the pinions W' and mounted upon the projecting end T of the shaft D. This projecting end of the shaft has a threaded portion T' with which a clamping nut is engaged to securely fasten the wheel to the shaft.

In the operation of changing from a manual to the power actuated device the cover S is first removed. The internal gear wheel X is then secured upon the end T of the shaft D, after which the housing U with the power unit therein is placed in registration with the housing A and secured thereto.

During engagement of the housing U with the housing A the pinions W' will enter into mesh with the internal gear wheel X, thereby effecting a coupling engagement between the motor and the shaft C.

One advantage of my improvement is that the hoist can be converted from manual to power operation either before or after installation. Thus a purchaser may obtain a simpler and less expensive construction which is manually operated, and at the same time when he finds it necessary can convert the same into a power hoist.

What I claim as my invention is:

1. The combination with a hoist provided with means for manual operation, of a housing therefor having a removable end cover, an auxiliary housing engageable with said housing when said cover is removed, and a motor in said auxiliary housing adapted for coupling engagement with the hoist mechanism when the two housings are connected.

2. The combination with a hoist provided with means for manual operation, of a housing for said hoist having a removable cover, an auxiliary housing engageable with said first-mentioned housing when said cover is removed, a motor in said auxiliary housing, and a reduction gearing also in said auxiliary housing and adapted for coupling engagement with the hoist mechanism.

3. The combination with a hoist designed for manual operation, of a housing therefor having a removable cover, an actuating shaft for the hoist mechanism having an extension exposed upon the removal of said cover, a coupling member for mounting on the extension of said shaft, an auxiliary housing for engagement with said first-mentioned housing when said cover is removed, a motor unit in said auxiliary housing, and a reduction gearing also within said auxiliary housing engageable with said coupling member and forming in connection therewith a transmission between said motor and hoist mechanism.

4. The combination with a hoist designed for manual operation and comprising concentrically arranged drive and driven members and a step-down transmission therebetween, of a housing for the mechanism having said step-down transmission arranged at one end thereof, a removable cover for the end of said housing in which said step-down gearing is arranged, an auxiliary housing for engagement with said first-mentioned housing when said cover is removed, a motor in said auxiliary housing, and a step-down transmission in said auxiliary housing having a coupling engagement with the drive member of said hoist mechanism when the two housings are in engagement with each other.

5. The combination with a hoist designed for manual operation and comprising an operating wheel at one end thereof, a shaft on which said wheel is mounted, a driven wheel concentric with said shaft, a step-down transmission gearing between said driven wheel and shaft at the opposite end of the latter from said operating wheel, and a housing enclosing the mechanism with said step-down gearing arranged at one end thereof, of a removable cover for the end of said housing in which said step-down gearing is arranged, an auxiliary housing engageable with said first-mentioned housing when said cover is removed, a motor unit in said auxiliary housing, a step-down gearing in said auxiliary housing including a central pinion on the motor shaft, a planetary pinion in mesh therewith, and an internal gear wheel for meshing with said planetary pinion, said internal gear wheel being mounted on the driving shaft of the hoist and being engageable with said planetary pinion when said auxiliary housing is placed in engagement with the main housing.

6. The combination with a hoist provided with means for manual operation and provided with a housing having a removable cover, of an auxiliary housing engageable with the main housing when said cover is removed, and a motor within said auxiliary housing having a coupling engagement with the hoist mechanism.

7. The combination with a hoist having a manually-operated wheel at one end and having a rotatable hoisting drum, and a housing for said hoist having a removable cover at the end opposite to said manually-operated wheel, of an auxiliary housing engageable with said first-mentioned housing when said cover is removed, and a motor in said auxiliary housing having a drive shaft in axial alignment with the axis of rotation of said hoisting drum and adapted for coupling engagement with said hoisting drum when the two housings are connected.

In testimony whereof I affix my signature.

WILLIAM E. SIMPSON.